United States Patent [19]

Bonner

[11] Patent Number: 5,039,159
[45] Date of Patent: Aug. 13, 1991

[54] SUN SHADE/SHIELD PANEL

[76] Inventor: Clifford M. Bonner, 3021 California Ave., Dayton, Ohio 45429

[21] Appl. No.: 625,533

[22] Filed: Dec. 11, 1990

[51] Int. Cl.$^5$ .............................................. B60J 11/00
[52] U.S. Cl. ................................... 296/136; 296/211; 135/88
[58] Field of Search ...................... 296/95.1, 96, 97.8, 296/136, 211; 135/88; 150/166

[56]  References Cited

U.S. PATENT DOCUMENTS

| | | | |
|---|---|---|---|
| 1,733,007 | 10/1929 | Dahl | 296/210 X |
| 2,334,856 | 11/1943 | Atkinson | 296/95.1 |
| 2,496,085 | 1/1950 | Engelheart | 296/95.1 X |
| 2,508,757 | 5/1950 | Gray | 135/88 |
| 2,608,942 | 9/1952 | Smith | 296/211 X |
| 2,623,481 | 12/1952 | Muciaccia et al. | 296/136 X |
| 2,629,347 | 2/1953 | Wittrien | 52/22 X |
| 2,643,910 | 6/1953 | Lyon | 296/95.1 |
| 2,783,082 | 2/1957 | Genua | 296/95.1 |
| 3,876,245 | 4/1975 | Lowery | 296/95.1 |
| 4,068,885 | 1/1978 | Berger | 296/77.1 |

FOREIGN PATENT DOCUMENTS

| | | | |
|---|---|---|---|
| 274296 | 3/1963 | Australia | 296/211 |
| 2536058 | 2/1977 | Fed. Rep. of Germany | 296/211 |
| 3427150 | 2/1986 | Fed. Rep. of Germany | 296/211 |

Primary Examiner—Johnny D. Cherry
Assistant Examiner—Joseph D. Pape
Attorney, Agent, or Firm—Joseph Patrick Burke

[57]  ABSTRACT

The present disclosure is directed to a sun shade/shield substantially rectangular panel with upper and lower surfaces and having a first hinge extending along the entire length thereof, along a non-central axis dividing the panel width into two non-equal portions; a second hinge extending along a portion only of the entire width thereof along an axis substantially perpendicular to that of the first hinge with the remainder of the panel width being split (separated) along a line constituting an extension of the first hinge axis, the first and second hinges dividing the panel length equally into hinged and split portions of greater and lesser areas, respectively; plurality of first a cross bars each having at least one finger having an openly facing portion for attachment to a portion of a vehicle roof luggage rack, the first cross bars with finger(s) positioned on each of the panel portions of greater and lesser area; and an additional cross bar having at least one finger having an openly facing portion on the panel portions of greater area wherein the additional cross bar finger(s) face in a direction substantially perpendicular to the second hinge axis.

11 Claims, 2 Drawing Sheets

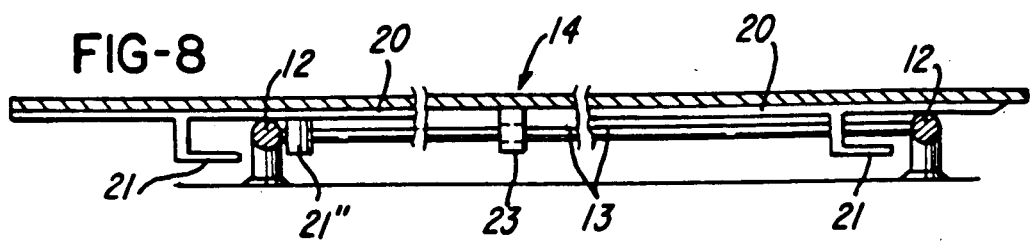
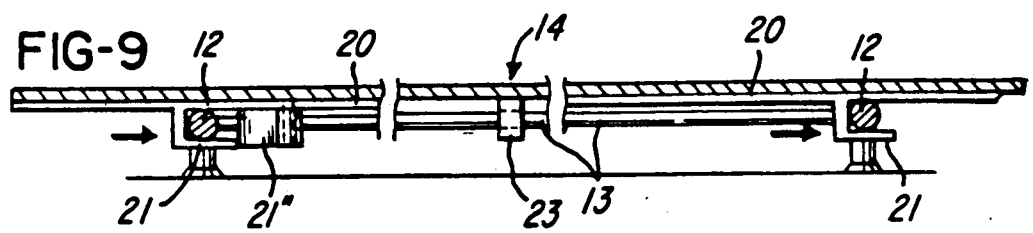
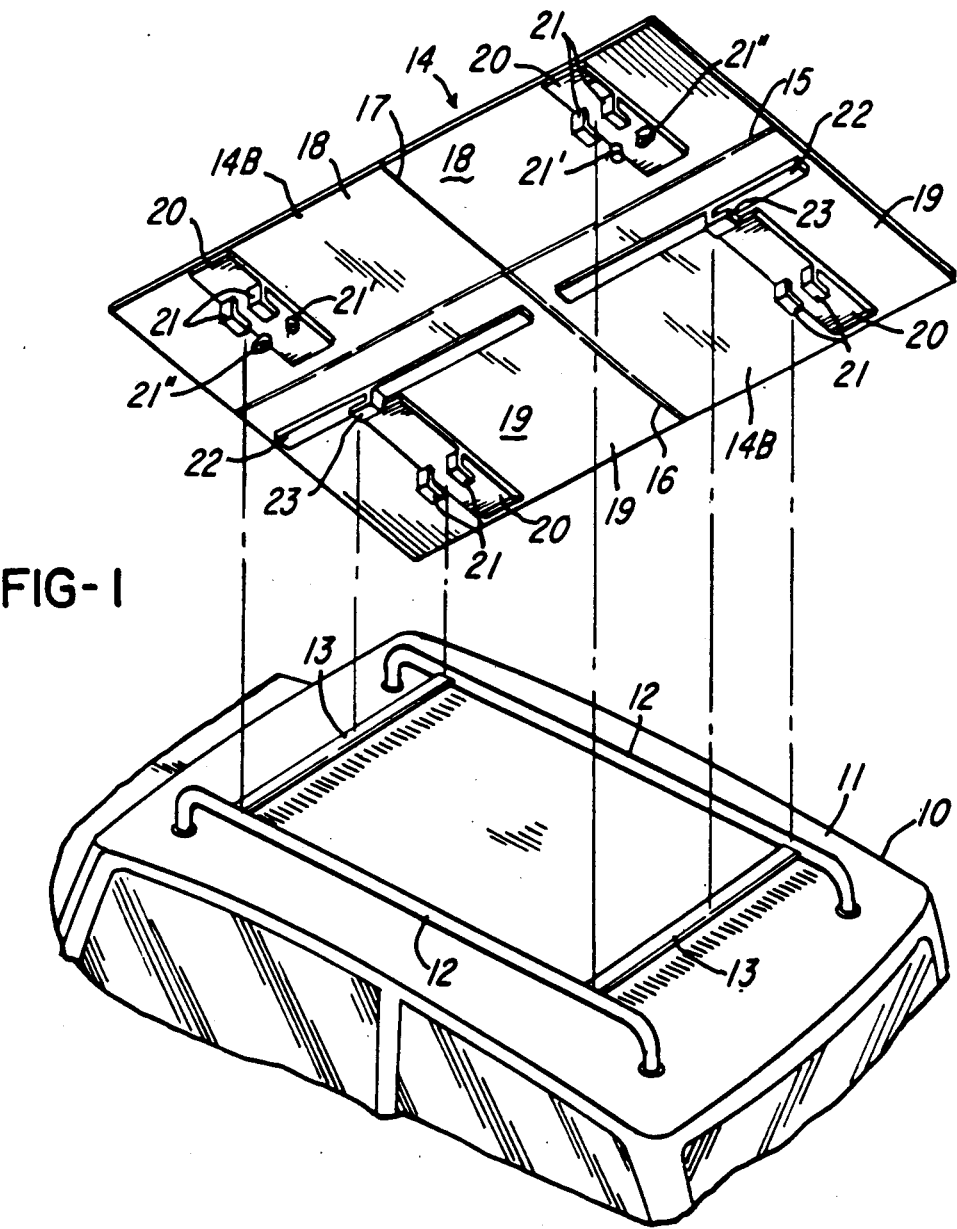

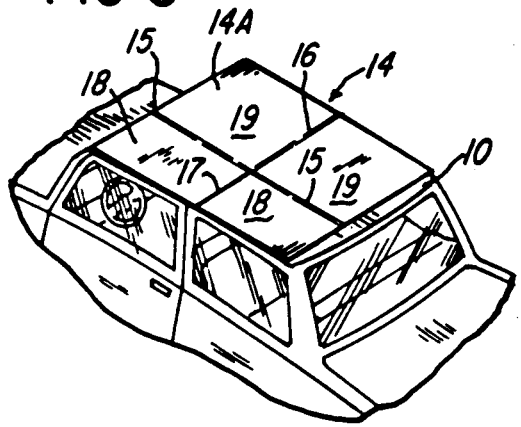
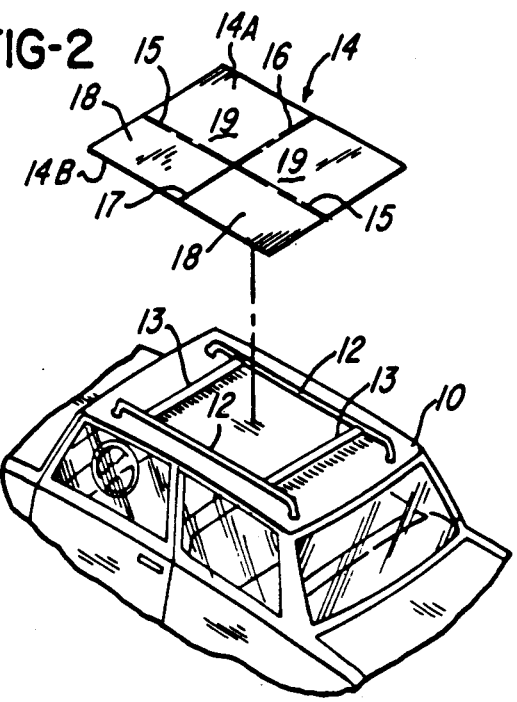
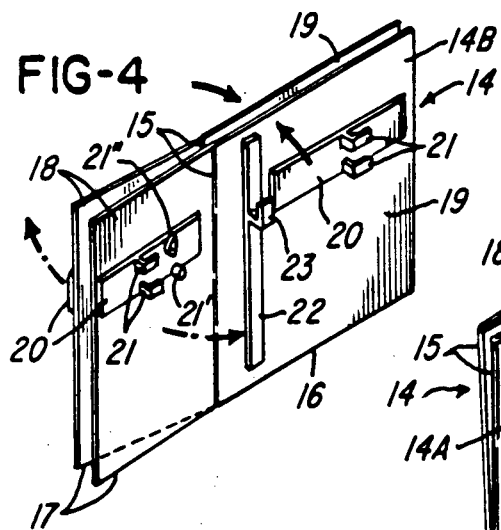
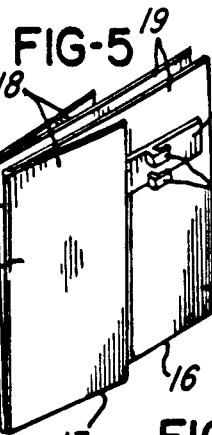
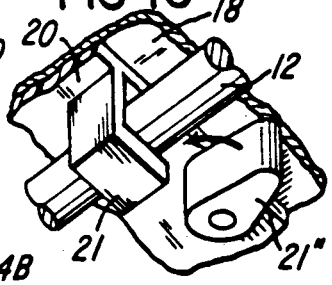
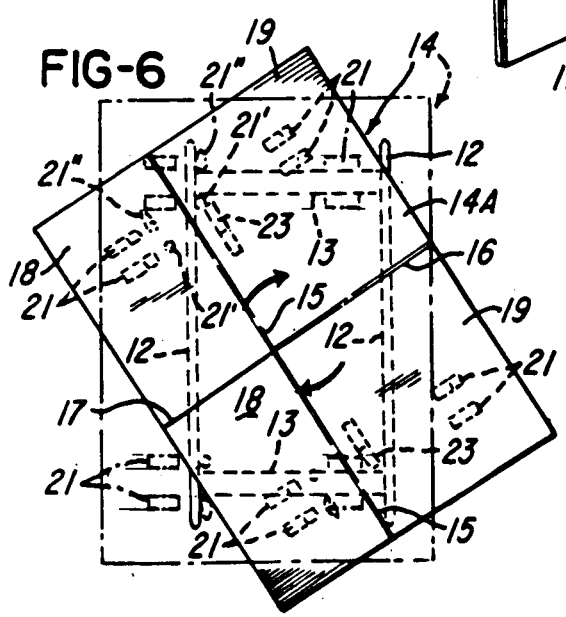
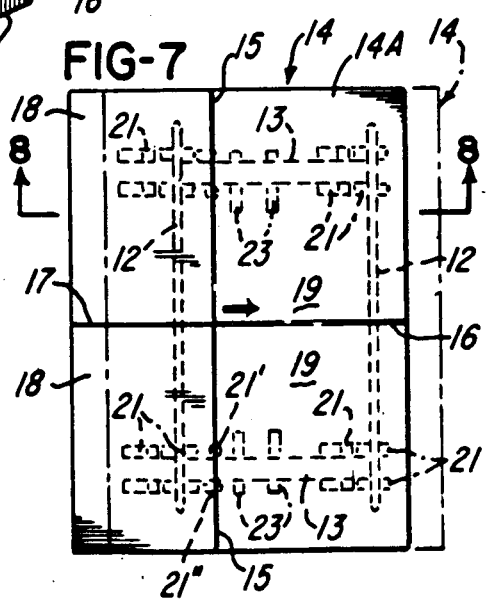

SUN SHADE/SHIELD PANEL

BRIEF DESCRIPTION OF THE INVENTION

The present invention is directed to a sun shade/shield substantially rectangular panel with upper and lower surfaces and having a first hinge extending along the entire length thereof, along a non-central axis dividing the panel width into two non-equal area portions; a second partial hinge extending along a portion only of the entire width thereof along an axis substantially perpendicular to that of said first hinge with the remainder of the panel width being split (separated) along a line constituting an extension of said second hinge axis, said first and second hinges and said split dividing the panel length equally into hinged and split portions of greater and lesser areas, respectively; a plurality of first cross bars each having at least one finger with an openly facing portion for attachment to a portion of a vehicle roof luggage rack, said first cross bar with finger(s) positioned on each of the panel portions of greater and lesser area; and an additional cross bar having at least one finger with an openly facing portion on said panel portions of greater area wherein said additional cross bar finger(s) face in a direction substantially perpendicular to the axis of said second hinge.

BACKGROUND OF THE INVENTION AND PRIOR ART

Vehicles parked in unshaded areas are exposed unprotected with respect to the direct sun light of the sun's rays. In certain cases, when the vehicle doors and windows are shut, the internal temperatures can build up to dangerously high levels resulting in danger to helpless persons, children, and animals, eg., pets left in such vehicles are subject to suffering heat stroke, dehydration, suffocation, and even death. Accordingly, most vehicle drivers try to park under a tree which offers shade tending to keep the temperature of the interior vehicle below that which can endanger any occupant.

The present invention provides a sun shade/shield which prevents the vehicle interior temperature from reaching dangerously high temperatures due to direct exposure to the sunlight such as would endanger persons or pets due to heat stroke, suffocation, etc.

Additionally while the sun shade/shield of this invention is installed on the roof of a vehicle, a safe, more comfortable environment is provided making the interior of the vehicle more comfortable even when the vehicle is not provided with air conditioning. Moreover, the sun shade/shield of the present invention places less of a demand on the vehicle air conditioning system of air conditioned vehicles provided therewith in that the seats, upholstery, and other vehicle part with which the driver and passengers come in contact upon entering will not require as extensive cooling when the vehicle is used after long periods of parking in unshaded areas.

Furthermore, the sun shade/shield panel of this invention requires only a few minutes or less to install and remove whereas those of the prior art require comparatively heavy frameworks, are cumbersome and some require attachment means that ruin the cosmetic appearance of the vehicles, and are therefore impractical.

Many attempts have been made in the prior art to provide acceptable sun shields or shades for cars.

U.S. Pat. No. 1,733,007 issued to S. M. Dahl is directed to a summer top for automobiles having a covering 31 which is stitched to a frame 10 which is in turn secured to a vehicle top 11. Covering 31 may be a flexible water-proofing material such as canvas.

U.S. Pat. No. 2,496,085 issued to A. C. Engelheart is directed to an auto sunshade having a canvas cover or canopy 15 arranged on a frame 14 on the top 12 of a vehicle. The frame 14 is preferably fabricated of aluminum and comprises a pair of elongated, longitudinally-extending, tubular, open-ended side braces 16 and 17 provided with bent front portions 18 and 19 inclined downwardly therefrom. The frame 14 and cover 15 are secured to the vehicle top using a pair of straps 45 extending around each of the side braces 16 and 17 along with hooks 46 on one end for engagement with the longitudinally extending rain spout or drip shield on the side of the vehicle. For adjusting the length of the strap 45, a buckle assembly 47 is provided. Cables 48 provided with clamps 50 connect the front angle bar 30 to the front fenders 13 of the vehicle for maintaining the frame on top of the vehicle. The cover 15 is provided with a plurality of cut-out portions 49 which are arranged so that the bent portions of the side braces 16 and 17 can project there through without tearing of the canvas cover 15.

U.S. Pat. No. 2,508,757 issued to O. A. Gray is directed to an automobile sun protector having a pair of socket members attached to the front and rear bumpers, respectively, of the automobile, a tubular upright member disposed in each of the sockets; rod slidably mounted in each of the tubular uprights; a T-shaped bracket secured to the upper end of each of said rods, the horizontal portion of said T-shaped bracket being dimeterically split above the vertical portion, said split portion being hingedly connected to each other and one of the split portions being hingedly secured to the vertical portion whereby all three segments of the T- bracket may be collapsed parallel to each other in a vertical plane. A supporting arm is inserted in each horizontal segment of each of the T-braces, and a shade is attached to the several of said supporting arms so as to be suspended above the automobile.

U.S. Pat. No. 2,608,942 issued to R. E. Smith is directed to a top insulator for motor vehicle bodies. The Smith top insulator has up-standing supports on the top of the body, a sheet-like cover on the supports spaced above the top and substantially co-extensive therewith. The cover has outlet openings arranged in staggered relation and distributed approximately throughout the area thereof, and forwardly directed deflector means beneath each of the openings for deflecting a current of air upwardly through the openings. The insulator body consists of a plate 16 formed of sheet metal. It is supported spaced above the top 15 by vacuum cups 12. The margins of the plate are secured to the vehicle body by elastic members 13.

U.S. Pat. No. 2,623,481 issued to S. Muciaccia et al is direcfed to a car protector or cover 11 for covering a part of the metallic body of a car constructed with flexible thermoplastic sheet material, elastic rubber-like bands or strips 15 cemented to the edges of the flexible sheet 11 of material and provided with a plurality of concavities or depressions 16 in its innerside forming suction cups for engagement with the car body part 13 and a spring clip under tension carried by said elastic strip and adapted to be attachably engaged to the car body part 13 to hold the sheet of material tightly thereon. Although a portion of this car protector is located on the roof of the car, there is no structure or disclosure in the Muciaccia et al patent of providing any benefit in reducing the internal temperatures of the vehicle upon exposure to sunlight.

U.S. Pat. No. 2,629,347 issued to H. P. Wittrien is directed to a heat protector roof construction for vehicles, particularly vehicles having a roof with sloping sides with rain gutters extending longitudinally along opposite edges. The Wittrien heat protector comprises a rigid metallic body portion having a contour generally similar to that of the vehicle roof so as to fit thereover between its rain gutters, and wherein the body portion has its leading edge formed to fit flush against the roof and portions of its sides formed to extend into the gutters and also having portions along its sides cut away to form air vents along its sides, above said gutters and between said portion that extend into said gutters, insulating material fastened to the under surface of the body portion, and means for releaseably attaching said body portion to said roof, there being a space between said roof and said insulating material when the body portion is attached to said roof.

U.S. Pat. No. 2,643,910 issued to G. A. Lyon is directed to a top shield 10 for automobiles in the form of a turtle-back-like configuration, constructed to overhang the front windows 12a, the four side windows 12b and the rear window 12c of automobile 12. Front and rear securing means, adapted to be disposed between said roof panel and said shield, are provided to secure such shield in spaced relation to said roof panel. Baffle means, defined by said front securing means, serves to baffle air from beneath said shield upwardly, and mean defining an opening above and forwardly of the baffle means provides for air passage.

U.S. Pat. No. 3,174,195 issued to J. P. Francis is directed to an adjustable automobile windshield awning designed to provide protection to the windshield area and a portion of the roof top from sun, rain, sleet, snow, or the formation of ice thereon and to so improve visibility for example when viewing outdoor movies at drive in theaters and other outdoor events, thus eliminating the continuous or on and off use of windshield wipers.

U.S. Pat. No. 3,876,245 issued to James I. Lowery is directed to an automobile sun and rain bonnet constituting basically a horizontal panel structure for disposition over and support from the roof portion of a vehicle, such as a passenger automobile. The panel structure serves both as a sun shield and a rain shield including front, rear and opposite side marginal portions for disposition along the corresponding marginal portions of the automobile roof portion. Each of the panel structure marginal portions defines an outwardly opening slot extending there along and an extension panel member which is shiftably disposed in each slot and extendible and retractable therein relative to the corresponding marginal portion of the panel structure. The panel structure consists of three layers or plies with the top ply being constructed of heat insulative material, the central ply comprising a plurality of side-by-side open ended tubular members and the lower ply comprising a thin sheet of material having poor heat transmitting properties. The tubes of the center ply extend longitudinally of the panel structure and the forward marginal edge of the upper ply includes an elongated radiant heat absorbing member extending therealong closely above the forward end of the tubes, whereby the radiant heat absorbing member may, by convection currents, generate a forward flow of cooling air through each of the tubes when the associated vehicle is at least substantially at a stand still.

U.S. Pat. No. 4,068,885 issued to Leon H. Berger is directed to a retractable heat shield for vehicles including a pair of end housings adapted to be detachably mounted adjacent the rear of a vehicle roof and a pair of telescopable members connected to each of such end housings to extend therefrom in generally parallel relation. A rod element is connected between the end housings and carries a shade element rollably thereon. A second pair of end housing are connected respectively to the other ends of the telescopable members and a transverse support rod is connected between the second pair of end housings. Hook elements are carried by the free edge of the shade element adapted to detachably mount the free end of the shade element on such support rod. Suction cups are carried by each of the end housings so that the heat shield can be removably mounted on the roof of a vehicle.

BRIEF DESCRIPTION OF THE DRAWINGS:

FIG. 1 is a perspective overall view of the sun shade/shield panel 14 of this invention in its environment of use, viz., ready to be installed on a vehicle roof having a luggage rack or panel roof support 11 to which panel 14 can be attached.

FIG. 2 is a perspective view showing the front to rear positional arrangement of panel 14 with respect to the vehicle luggage rack or panel support.

FIG. 3 is a perspective view showing panel 14 in place on the vehicle roof.

FIG. 4 is a perspective view of the panel 14 of this invention partly folded.

FIG. 5 is a perspective view of the panel 14 of this invention fully folded.

FIG. 6 is a perspective partly in phantom line showing the panel of this invention arranged with respect to the vehicle roof luggage rack or panel roof support at the beginning of the placement of panel 14 on the luggage rack or panel support.

FIG. 7 is a perspective view with the panel of this invention partly secured on the luggage rack or panel roof support, viz., with its additional fingers in place gripping the luggage rack perpendicular struts prior to sliding the remaining fingers of the first cross bars into position to grip the luggage rack (panel support) longitudinal members.

FIG. 8 is a cross-sectional view along the lines 8—8 of FIG. 7 showing the additional fingers in place gripping the luggage rack perpendicular struts.

FIG. 9 is a cross-sectional view of the panel of this invention with the fingers moved into position to grip the luggage rack (panel support) longitudinal members.

FIG. 10 is an enlarged perspective view of a portion of panel 14 as shown in FIG. 1 showing the pivotable locking mechanism.

DETAILED DESCRIPTION OF THE INVENTION

As will be noted particularly with reference to FIG. 1, vehicle roof 10 has a luggage rack or sun shade/shield panel support 11. This luggage rack, or panel support, is composed of longitudinally extending bent members 12 which are secured on the upper portion of the vehicle roof 10 and reinforced by substantially perpendicular reinforcing struts 13. The longitudinal members 12 extend along the long axis of the roof. The sun shade/- shield panel 14 of this invention has an upper surface 14a and a lower surface 14b. The panel 14 is equipped with a first fold hinge 15 which extends the entire length of the panel along a non-central axis, viz., the axis of the fold hinge 15 is not along the center line of the length of panel 14. This offset is to assist in placing the panel readily upon the longitudinal and perpendicular reinforcing struts which make up the vehicle roof luggage rack or panel roof support 11 and to permit easy removal for storage.

The panel is also equipped with a second, partial fold hinge 16 which extends along a portion only of the panel width along an axis substantially perpendicular with that of the first hinge. The panel 14 also has a split or separation 17 along a line constituting an extension of the second hinge axis, thus dividing the panel into hinged and split portions of lesser areas 18 and hinged portions of greater areas, 19, respectively.

As will be noted from FIGS. 1, 2, 3, 6 and 7; panel portions of lesser area 18 have both fold hinged and split portions compared with greater area panel portions 19 which are doubly hinged.

Positioned in a generally perpendicular manner to the long axis of panel 14 are cross bars 20 having parallelly facing "L-shaped" fingers 21. "L-shaped" fingers 21 have a thicker heel portion and a thinner lateral portion. In accordance with one embodiment of this invention, the parallelly facing "L-shaped" fingers 21 can be integral (one piece and unitary) with the cross bars 20 and made of the same material. Cross bars 20 can be fixedly secured to the bottom or lower surfaces 14a and 14b of panel portions 18 and 19 in any known manner.

The greater are panel portions 19 also have one additional cross bar each, 22, with its corresponding outwardly facing "L-shaped" fingers 23. Similarly, fingers 23 can be integral with the additional cross bars 22. It will be noted, especially from FIG. 1 that cross bars 22 are fixedly secured, e.g., with appropriate adhesive, or by heat sealing, etc., to the larger area portion 19 with both of the open end of their respective fingers 23 facing outwardly from one another. It will also be observed that the long axis of these additional cross bars 22 are mounted in a generally perpendicular manner with respect to the long axis of first cross bars 20 which also are mounted on the greater area panels 19.

Lesser area panel portions 18 are provided with vertical fingers 21' positioned sufficiently spaced from fingers 21 to allow vertical fingers 21' to straddle roof rack rail 12 before fingers 21 engage under said rail to permit pulling the top of the sun shade/shield panel down snugly. The length of vertical fingers 21' is approximately the same as the heel (thicker) portion of "L-shaped" fingers 21. Stated in another way the length of vertical fingers 21' should not extend any lower than the outermost tip of "L-shaped" fingers 21 as it must be clear of the roof rail or the panel 14 cannot be lowered into position. Hence the length of vertical fingers 21' is equal to or less than, viz., does not exceed, the length of the thicker portion of "L-shaped" fingers 21.

Generally teardrop-shaped pivotable lock members 21" pivot with respect to vertical fingers 21' to releasably lock the sun shade/shield panel 14 on the luggage rack or panel roof support 11 (FIG. 10).

Panel 14 can be constructed of cardboard, preferably water proofed or water-resistant cardboard; fiberglass; fiberglass-resin composites; plastic; etc. When it is made of plastic, preferably rigid, strong, light weight plastic reflective material is employed. Regardless of the material used preferably the panel 14 has a size and exterior peripheral configuration commensurate with the vehicle roof outline with which it is employed. Plastic materials which can be employed include, but are not necessarily limited to: polyethylene, polypropylene, polycarbonates, acrylic plastics, such as polyacrylates, etc.

It will be noted that the sun shade/shield panel of this invention can be folded readily with its upper surface portions 14A facing inwardly toward one another and then the lower surface portions 14B of panel lesser area portions 18 fold against portions 14B of larger area portions 19 to a size permitting ready storage in the vehicle trunk or other storage area. Note FIGS. 4 and 5 in this regard.

In accordance with the preferred embodiment of this invention, a minimum of three inches of air space is provided between the bottom surface 14b of the panel and the upper surface of the vehicle roof. In the event that the vehicle to which the panel of this invention is to be attached does not have a luggage or ski rack in place thereon, it is preferable to utilize a panel support having longitudinal members 12 of a tubular or bar configuration with bent end portions whose bases can be flanged for attachment to the vehicle roof and having substantially perpendicular cross portions as reinforcing struts such as those shown at 13 in the drawings at FIGS. 1 and 2.

The cross bars 20 and 22 can be made of any desired material. However, it is preferable in accordance with this invention that the cross bars 20 and 22 be made of a plastic material, such as any of those materials set forth above with respect to panel 14. Similarly, it is preferable to have fingers 21 and 23 and vertical fingers 21' made of plastic material and integral with cross bars 20 and 22, respectively. Pivotable lock members 21" are also preferably made of plastic and pivotally attached to cross bars 20.

Installation of the sun shade/shield of this invention is accomplished as follows:

(1) Place the folded sun shade/shield FIG. 5 onto the vehicle roof rack 12 and 13 of FIG. 1 with the panel larger area portions 19 toward the passenger's side;

(2) Extend panel portions 18 FIG. 4 to open position;

(3) Open entire panel portions 18 and 19 to full open position and place the sun shade/shield onto the roof rack 12 and 13 of FIG. 1;

(4) Rotate entire panel 14 to an approximate 45 degree angle as shown on FIG. 6;

(5) Ascertain that fingers 23 of crossbar 22 (FIG. 1) are inside the rectangle formed by the roof rack 12 and 13 of FIGS. 1 and 6;

(6) Rotate the entire panel 14 (FIGS. 1 and 6) in a clockwise direction to engage fingers 23 under the cross struts 13 (FIGS. 1 and 7), making sure that fingers 21 of panel portions 19 are inside the roof rack (FIGS. 7 and 8) and that fingers 21 of panel 18 are outside to the left of the roof rack as shown on FIGS. 7 and 8;

(7) Then the entire sun shade/shield is then slid to the right (toward the passenger's side) which engages all fingers 21 of panel portions 18 and 19 (FIGS. 1 and 9). Just before fingers 21 of panel portions 18 (FIGS. 1 and 8) engage under the left rail the vertical fingers 21' come down on both sides of perpendicular struts 13 of FIGS. 1 and 8; and finally (8) With the entire panel now in place the locking device, viz., teardrop-shaped pivotable lock mebers 21" are rotated to secure the sun shade/shield in position. This assures that the entire panel 14 is locked in place in order ro resist torsiional forces created by wind action.

Removal of the sun shade/shield is accomplished in reverse order as follows:

(1) Rotate the teardrop shape locking devices to unlock and release the panels.

(2) Slide the entire panel toward the driver's side of the vehicle just far enough for the vertical fingers 21' to contact the left rail 12 as shown in FIG. 1.

(3) The outside portions of panel 18 are then raised to permit the entire panel 14 to be rotated in a counter-clockwise direction as shown in FIG. 6, which releases all fingers.

(4) The panel is then folded so that surfaces 14a come in contact with one another.

(5) Finally panel portions 18 are then folded so that the undersides of panel portions 18 and 19 face toward each other. This presents the smallest package possible for easy removal and storage.

Thus it will be observed that there has been provided an effective, inexpensive, readily insertable and removable sun shade/shield panel which can be put in place in a minimum of time and removed from the roof luggage rack (panel support) structure readily and which can be folded to enable it to fit in any vehicle trunk. This panel 14 has a feature of being universal in that it can be made to fit virtually any vehicle roof regardless of the size or design thereof.

What is claimed is:

1. A sun shade/shield panel comprising a substantially rectangular panel with upper and lower surfaces and having a first hinge extending along its entire length along a non-central axis dividing said panel width into non-equal area portions; a second, partial hinge extending along a portion only of its entire width along an axis substantially perpendicular to that of said first hinge, with the remainder of said panel width being separated along a line constituting an extension of said second hinge axis, wherein said first and second hinges and said separation divide said panel length into hinged and separated portions of greater and lesser areas, respectively; a plurality of first cross bars each having at least one finger with an openly facing portion for attachment to a portion of a vehicle roof luggage rack or panel roof support, said first cross bar positioned on each of said panel portions of greater and lesser area; and an additional cross bar having at least one finger with an openly facing portion on said panel portions of greater area, said additional cross bar open finger(s) facing in a direction substantially perpendicular to said second hinge axis.

2. A sun shade/shield panel as in claim 1 wherein said first and second hinges are fold hinges.

3. A sun shade/shield panel as in claim 1 wherein said first cross bars are positioned in a generally perpendicular manner to the long axis of said panel.

4. A sun shade/shield panel as in claim 1 wherein said openly facing fingers are L-shaped.

5. A sun shade/shield panel as in claim 1 wherein said fingers are integral with said cross bars.

6. A sun shade/shield panel as in claim 1 wherein said cross bars are fixedly secured to said panel portions.

7. A sun shade/shield panel as in claim 1 which includes a vertical finger on said cross bars attached to said panel portions of lesser area.

8. A sun shade/shield panel as in claim 7 wherein said openly facing fingers are L-shaped having thicker and thinner portions and the length of said vertical fingers does not exceed the length of said thicker portion of said openly facing fingers.

9. A sun shade/shield panel as in claim 1 which includes a pivotable lock member on said cross bars attached to s id lesser area panel portions.

10. A sun shade/shield panel as in claim 9 wherein said pivotable lock members are generally teardrop-shaped.

11. A sun shade/shield panel as in claim 9 wherein each pivotable lock member pivots with respect to a vertical finger on said cross bars attached to said lesser area panel portions to releasably lock said panel on said vehicle roof rack or panel support.

* * * * *